United States Patent [19]

Yamamura et al.

[11] E Patent Number: Re. 33,652

[45] Reissued Date of Patent: Jul. 30, 1991

[54] ELECTRICALLY DRIVEN COMPRESSOR WITH A PERIPHERAL HOUSING WELD

[75] Inventors: Michio Yamamura; Kiyoshi Sawai, both of Kusatsu; Katuharu Fujio, Shiga; Shuuichi Yamamoto, Kyoto; Hiroshi Morokoshi, Shiga, all of Japan

[73] Assignee: Matsushita Electric Industrial Co., Ltd., Osaka, Japan

[21] Appl. No.: 312,197

[22] Filed: Feb. 14, 1989

Related U.S. Patent Documents

Reissue of:

[64] Patent No.: 4,744,737
Issued: May 17, 1988
Appl. No.: 56,410
Filed: May 29, 1987

[30] Foreign Application Priority Data

May 30, 1986 [JP] Japan ..... 61-126022

[51] Int. Cl.[5] ..... F04B 39/12; F01C 1/04

[52] U.S. Cl. ..... 418/55.1; 417/902; 228/184; 29/888.02

[58] Field of Search ..... 417/902; 418/55.1; 228/184, 250; 29/156.4 R, 428, DIG. 48

[56] References Cited

U.S. PATENT DOCUMENTS

| | | | |
|---|---|---|---|
| 2,297,554 | 2/1940 | Hardy et al. | 228/249 |
| 4,611,830 | 9/1986 | von Ahrens | 228/250 X |
| 4,655,696 | 4/1987 | Utter | 418/55 |
| 4,655,697 | 4/1987 | Nakamura et al. | 418/55 |

FOREIGN PATENT DOCUMENTS

| | | |
|---|---|---|
| 0037658 | 3/1981 | European Pat. Off. . |
| 60-73081 | 4/1985 | Japan . |
| 1558136 | 12/1979 | United Kingdom . |
| 2154665A | 9/1985 | United Kingdom . |
| 2159884A | 12/1985 | United Kingdom . |

*Primary Examiner*—Leonard E. Smith
*Assistant Examiner*—Eugene L. Szczecina, Jr.
*Attorney, Agent, or Firm*—Wenderoth, Lind & Ponack

[57] ABSTRACT

An electrically driven compressor has a closed vessel including upper and lower vessels, a compression mechanism disposed at the upper portion of the lower vessel to communicate, on its suction side, with the inside of the lower vessel and an electric motor disposesd under the compression mechanism inside the lower vessel to electrically drive the compression mechanism. The compression mechanism includes a stationary impeller component having a stationary impeller, a rotary impeller component having a rotary impeller for engaging with the stationary impeller to define a plurality of spaces to be compressed between them, a crank shaft rotatably driving the rotary impeller component, a bearing component for supporting the crank shaft, a self-rotation restricting component for restricting the self-rotation of the rotary impeller component but allowing only its forced rotation, a thrust bearing for supporting the rotary impeller component axially biased to it, and a partition frame component interposed between the stationary impeller and bearing components. The partition frame component is interposed between the upper and lower vessels at their respective open ends so that both vessels may be completely sealed through the partition frame component by welding its entire outer periphery.

4 Claims, 2 Drawing Sheets

ELECTRICALLY DRIVEN COMPRESSOR WITH A PERIPHERAL HOUSING WELD

Matter enclosed in heavy brackets [ ] appears in the original patent but forms no part of this reissue specification; matter printed in italics indicates the additions made by reissue.

BACKGROUND OF THE INVENTION

The present invention generally relates to a compressor and more particularly, to an electrically driven compressor of the scroll type having a combination of movable and stationary impellers.

FIG. 1 illustrates one of the conventional compressors which is primarily comprised of a closed vessel or housing 101, a compression mechanism portion 102 disposed at the upper portion inside the closed vessel 101, an electric motor 103 disposed under the compression mechananism portion 102 and a lubricating oil sump 104 formed at the bottom portion inside the closed vessel 101. The compressor having the above-described construction is a low pressure type in which a suction pipe 105 is open to the inside of the closed vessel 101 so that pressure on the suction side may be effected therein. An upper vessel 106 is disposed on the discharge side of and above the compression mechanism portion 102 to define a discharge chamber 107 communicating with a discharge pipe 108. As shown by arrows in FIG. 1, refrigerant carrier gas is introduced into the closed vessel 101 from the suction pipe 105 to be compressed at the compression mechanism portion 102 and is discharged into the discharge chamber 107 through a discharge port 109 so that it may flow out towards the side of a refrigeration cycle form the discharge pipe 108.

Such a compressor, however, is subject to some problems, which will be henceforth described, since the compression mechanism potion 102 is disposed inside the closed vessel 101 so as to tightly engage with the inner peripheral surface thereof.

In other words, one of the following means is conceived as a means for securing the compression mechanism portion 102 inside the closed vessel 101:

(1) a press fitting means ensuring the sealing property through a process with high accuracy (2) a press fitting means ensuring the sealing property by coating a sealing compound or a bonding material (3) a welding means to be executed from outside.

First, when the means (1) is employed, it is necessary to execute the machining of the engaged portion between the closed vessel 101 and the compression mechanism portion 102 with high accuracy. According, employing this means results in an increased cost and is, therefore, unsuitable for mass production in bulk.

Furthermore, the compression mechanism portion 102 is required to be pressed into the closed vessel 101 by a considerably large pressure in order that the tightness therebetween is ensured by preventing any leak of the pressure between the suction and discharge sides of the compression mechanism portion 102. This press fitting results in an excessive pressure being exerted on the compression mechanism portion 102 and deformation thereof, and consequently, the compression efficiency can not be obtained satisfactorily.

To solve this problem, thickening some parts of the compression mechanism portion 102 to strengthen them has been considered, but such construction does not result in advantageous characteristics associated with weight-saving or a small size.

Secondly, when the means (2) is employed, the sealing compound or bonding material is dissolved by heat produced during the welding between the closed and upper vessels 101 and 106. As a result, the compressor is undesirably reduced in performance, since sufficient air-tightness can not be achieved between the suction and discharge sides of the compression mechanism portion 102.

Thirdly, in case of the means (3), since the compression mechanism portion 102 is primarily made of cast iron, it can be welded to the closed vessel 101 only at a plurality of spaced peripheral portions thereof, but not continuously. Such welding produces deformation between welded portions and non-welded portions, and thus the air-tightness between the suction and discharge sides of the compression mechanism portion 102 can not be satisfactorily ensured.

Moreover, in the compressor having the construction as shown in FIG. 1, a bearing 111 disposed inside the closed vessel 101 has a first surface 111a supporting a thrust bearing 110 and a second surface 111b at which the bearing 111 is kept in contact with a stationary impeller component 112, with the first surface 111a being stepped down from the second surface 111b. Accordingly, the bearing 111 is required to be fitted with high accuracy to ensure sufficient air-tightness between the stationary and rotary impeller components 112 and 113. As a result, the compressor of FIG. 1 is not suited to be produced in bulk.

As described so far, the construction of the compressor shown in FIG. 1 not only inevitably requires high accuracy with regard to design aspects, but when assembling a compressor having such a construction it is difficult to provide the desirable air-tightness in assembling.

SUMMARY OF THE INVENTION

Accordingly the present invention has been developed with a view to substantially eliminate the above described disadvantages inherent in the prior art compressor, and has for its essential object to provide an improved compressor which is free from heat distortion of a closed vessel and a compression mechanism portion following welding and makes it possible to minimize inferior accuracy in the assembling process.

Another important object of the present invention is to provide a compressor of the above-described type, which is capable of being easily assembled by simultaneously conducting the sealing and securing of the compression mechanism portion within the closed vessel.

A further object of the present invention is to provide a compressor of the above described type, in which it is possible to facilitate the assembling of the compressor mechanism portion with high accuracy by simplifying the configuration of a partition frame component constituting the compressor mechanism portion.

A still further object of the present invention is to provide a compressor of the above-described type, which is capable of being simply and ensuredly welded to stably securing the compressor mechanism portion within the closed vessel by way of the partition frame component.

An even further object of the present invention is to provide a compressor of the above-described type, which is capable of being produced in bulk.

In accomplishing these and other objects, according to one preferred embodiment of the present invention, there is provided an electrically driven compressor having a closed vessel comprised of upper and lower vessels, a compression mechanism disposed at the upper portion of the lower vessel of the closed vessel communicating, on its suction side, with the inside thereof, and an electric motor disposed under the compression mechanism inside the lower vessel to electrically drive the compression mechanism, wherein the compression mechanism is characterized by a stationary impeller component having a stationary impeller, a rotary component having a rotary impeller for engaging with the stationary impeller to define therebetween a plurality of spaces to be compressed, a crank shaft rotatably driving the rotary impeller component, a bearing component for supporting the crank shaft, a self-rotation restricting component for restricting the self-rotation of the rotary impeller component but allowing only a forced rotation thereof, a thrust bearing for supporting the rotary impeller component axially biased thereto, and a partition frame component interposed between the stationary impeller and bearing components. Furthermore, according to the present invention, the partition frame component is interposed between the upper and lower vessels at respective open ends thereof so that the upper and lower vessels may be completely sealed through the partition frame component by welding the entire outer periphery thereof.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
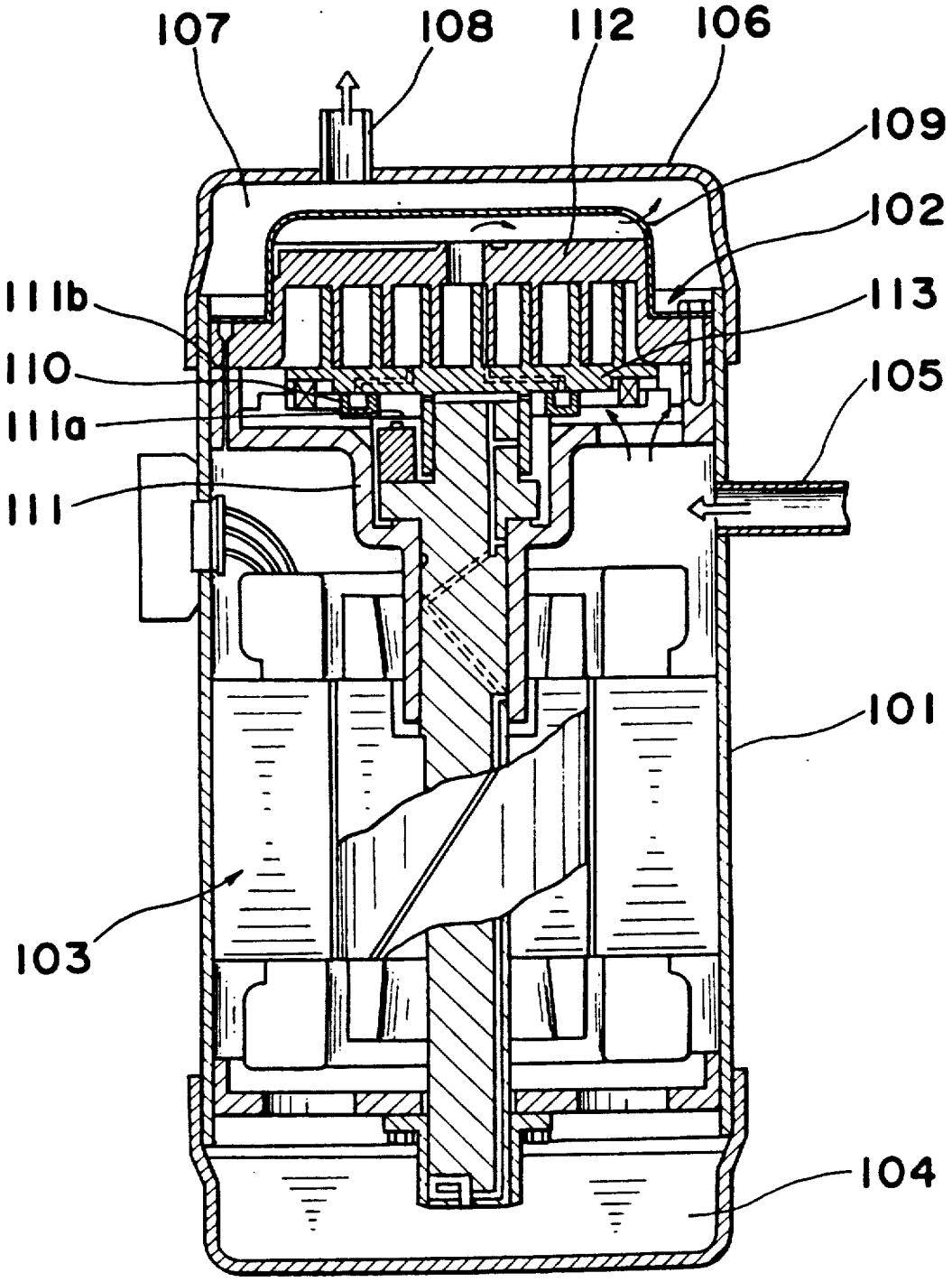
Fig. 1 PRIOR ART
FIG. 1 is a longitudinal sectional view of a conventional electrically driven compressor (already referred to)
Figure 2:
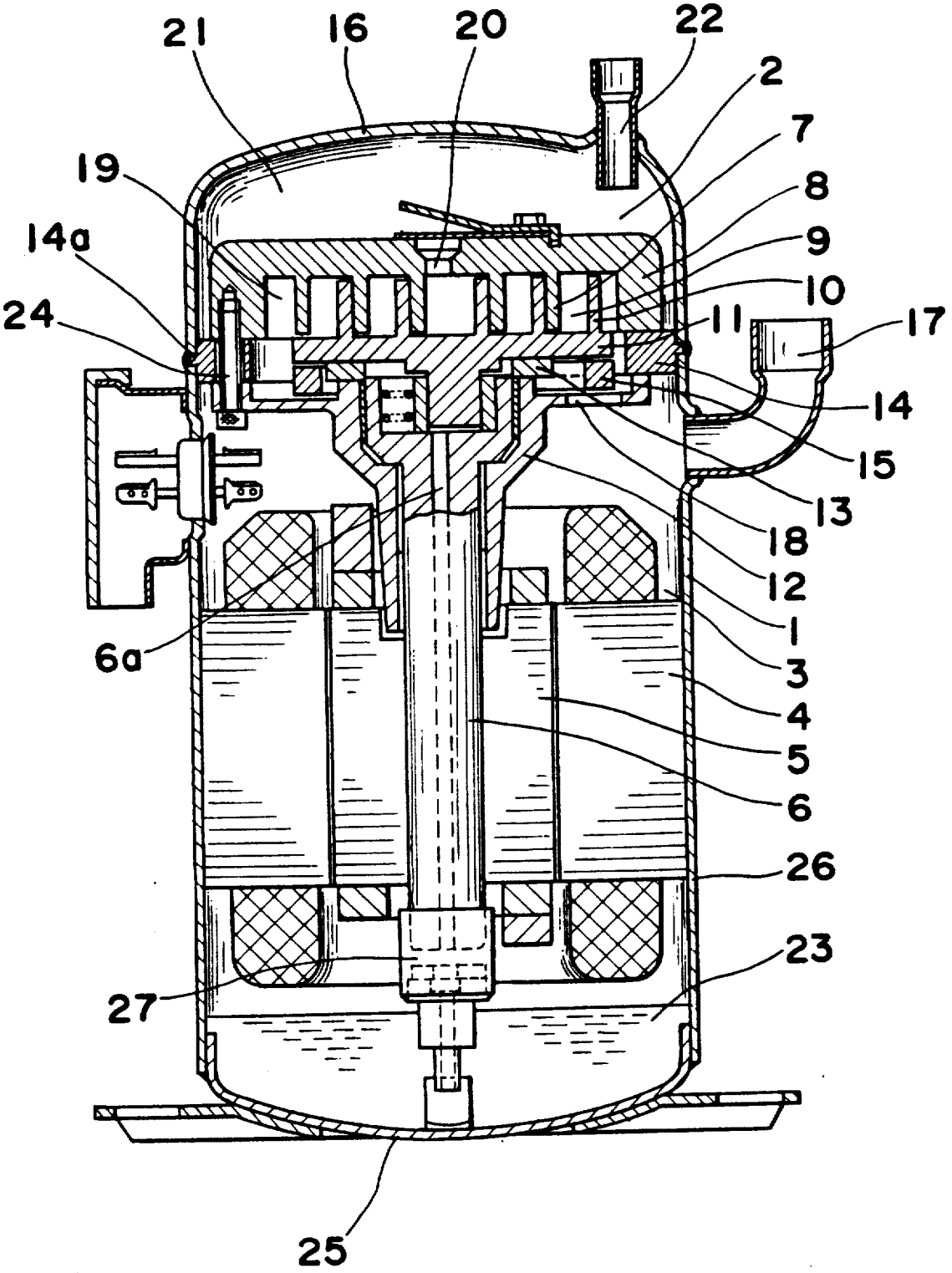
FIG. 2 is a view similar to FIG. 1, which particularly shows an electrically driven compressor according to one preferred embodiment of the present invention.

Referring now to FIG. 2, an electrically driven compressor according to one preferred embodiment of the present invention is provided with a lower half 1 of a closed vessel (referred to as a lower vessel hereinafter), a scroll type compression mechanism 2 disposed on the lower vessel 1, and electric motor 3 disposed inside the lower vessel 1 and under the compression mechanism 2, and an upper half 16 of the closed vessel disposed on the discharge side thereof (referred to as an upper vessel hereinafter). The electric motor 3 is comprised of a stator 4 securely mounted in the lower vessel 1 by press fitting, and a rotor 5 coupled to a crank shaft 6 of the compression mechanism 2.

The compression mechanism 2 included a stationary impeller component 8 having a stationary impeller 7, a rotary impeller component 11 having a rotary impeller 10 for engaging with the stationary impeller 7 to define a plurality of compression spaces 9 therebetween, a bearing component 12 for supporting the crank shaft 6, a partition frame component 14 interposed between the bearing and stationary impeller components 12 and 8 to rigidly connect them therethrough, a thrust bearing 13 for supporting the rotary impeller component 11 biased thereto by a pressure produced in the compression spaces 9, an annular self-rotation restricting component 15 having keys on opposite faces thereof and disposed along the outer periphery of the thrust bearing 13 to restrict the self-rotation of the rotary impeller component 11 but to allow only a forced rotation thereof, or the like. The stationary impeller, rotary impeller and bearing components 8, 11 and 12 respectively are made of cast iron which has superior machining characteristics.

The discharge side upper vessel 16 encircling the stationary impeller component 8 is hermetically welded, together with the lower vessel 1, onto the outer periphery of the partition frame component 14, formed annularly or in the form of a doughnut, from a material such as soft steel or the like which can be readily welded or processed, with opposite upper and lower faces of the partition frame component 14 being ground with high accuracy so as to be parallel to each other. This is because the partition frame component 14 is rigidly secured between the stationary impeller and bearing components 8 and 12 by bolts 24, while the rotary impeller component 11 and the thrust bearing 13 are incorporated therein, so that the engagement between the stationary and rotary impellers 7 and 10 may be kept in tightness with high accuracy. Accordingly, with the opposite faces of the partition frame component 14 being very flat, the rotary impeller component 11 is desirably biased radially towards the stationary impeller component 8 and axially towards the thrust bearing 13.

Furthermore, the partition frame component 13 is not only caused to closely contact, at its outer peripheral surface, with the inner peripheral surfaces of the upper and lower vessels 16 and 1, but is also provided with a continuous annular projection 14a formed on its outer peripheral surface. The projection 14a is designed to be slightly less than the thickness of the upper or lower vessel 16 or 1. Opposite upper and lower surfaces of the projection 14a extend parallel to those of the partition frame component 14, since they are brought into close contact with the open end of the upper or lower vessel 16 or 1.

A suction pipe 17 is securely connected to the outer peripheral surface of the lower vessel 1 so as to communicate with the inside thereof and a suction port 18 introducing refrigerant carrier gas therethrough into the compression mechanism 2 is defined in the bearing component 12. A suction chamber 19 and a discharge port 20 are defined in the stationary impeller component 8 so that the refrigerant carrier gas may be led into the spaces defined between the stationary and rotary impeller components 8 and 11 through the suction chamber 19 and discharge from the discharge port 20 into a discharge side upper vessel 16. A discharge pipe 22 is securely connected to the upper vessel 16 so as to communicate with the inside thereof. The lower vessel 1 is comprised of a cylindrical member 26 and a bottom cover 25 rigidly welded to the cylindrical member 26. An oil pump 27 is disposed on the crank shaft 6 at the lower portion thereof.

The assembling procedure of the closed type compressor having the above-described construction will be described hereinafter.

Prior to the welding of the bottom cover 25 of the discharge side lower vessel 1 onto the cylindrical member 26 thereof, the stator 4 of the electric motor 3 is initially pressed into the cylindrical member 26 to be rigidly secured therein. The stationary and rotary impeller components 8 and 11, thrust bearing 13, crank shaft 12, partition frame component 14 and the like are assembled together to form the compressor mechanism 2, and the rotor 5 of the electric motor 3 is securely mounted onto the crank shaft 6.

The compressor mechanism unit assembled in the above-described manner is inserted into the cylindrical member 26 of the lower vessel 1 internally securely accommodating the stator 4 of the electric motor 3. In this event, since the projection 14a of the partition frame component 14 is brought into contact with the open end surface of the lower vessel 1 and a gap gauge (not shown) is interposed between the stator 4 and the rotor 5, the compressor mechanism unit is desirably positioned inside the cylindrical member 26.

The upper vessel 16 is, then, is positioned over the compressor mechanism 2 and is properly positioned through contact thereof with the projection 14a of the partition frame component 14 thereby covering the compressor mechanism.

Subsequently, the projection 14a of the partition frame component 14 is welded, at its entire outer periphery, to the upper and lower vessels 16 and 1 so that the compressor mechanism 2 may be enclosed air-tightness and secured therein.

Finally, the gap gauge is drawn out of the bottom portion of the cylindrical member 26 of the lower vessel 1 and the assembling is finished by welding the bottom cover 25 onto the cylindrical member 26.

It is to be noted here that lubricating oil can be poured into the compressor through the suction pipe 17.

The operation of the electrically driven compressor assembled in the above-described manner will be explained hereinafter.

When the crank shaft 6 is rotatably driven by the electric motor 3, the rotary impeller component 11 is caused to rotate and the refrigerant carrier gas is introduced into the lower vessel 1 through the suction pipe 17. Hereupon, a part of the lubricating oil contained in the refrigerant carrier gas is separated therefrom and the refrigerant carrier gas is introduced into the suction chamber 19 through the suction port 18 so as to be confined within the spaces defined by the stationary and rotary impellers 7 and 10. The refrigerant carrier gas is gradually compressed with the rotation of the rotary impeller component 11 and is, then, discharged into the discharge side space 21 from the discharge port 20. Thereafter, the refrigerant carrier gas once stored within the discharge side space 21 is discharged out, through the discharge pipe 22, towards a refrigeration cycle.

Meanwhile, a thrust force which causes the rotary impeller component 11 to be forced away from the stationary impeller component 8 in the axial direction thereof, arises during the compression process of the refrigerant carrier gas and acts on the bearing component 12 by way of the thrust bearing 13 so that it may be finally supported, through the partition frame component 14, by the lower vessel 1 securely welded thereto.

A lubricating oil sump 23 is formed at the lower portion of the vessel 1 and the lubricating oil collected therein is led, by the oil pump 26, towards each movable portion through an oil passage defined in the crank shaft 6.

The electrically driven compressor of the present invention provides several effects which will be henceforth described.

Since the partition frame component 14 of the compression mechanism 2 is sandwiched between the upper and lower vessels 16 and 1 and the sandwiched portion thereof is, then, fully welded together with the both vessels 16 and 1, it is possible to simultaneously conduct the securing of the compressor mechanism 2 and the sealing of the upper and lower vessels 16 and 1 and the compressor mechanism 2, thus resulting in superior workability.

Furthermore, since the aforementioned welding also provides the sealing of the suction and discharge sides in the compressor mechanism 2, both of the sides are effectively tightly sealed and a joint strength of the weld is remarkably high, and accordingly, the sealing property is remarkably reliable.

In addition, heat distortion of the partition frame component 14 can be minimized, because the heat produced during the welding is dispersed from the partition frame component 14 towards the stationary impeller and bearing components 8 and 12. Accordingly, the accuracy of the construction facilitated the assembling process can be maintained and the resulting compressor has both high quality and accuracy.

Moreover, according to the present invention, the opposite faces of the partition frame component 14 are parallel and flat and the partition frame component 14 and the thrust bearing 13 on the same plane. Accordingly, both the partition frame component 14 and the bearing component 12 for supporting the thrust bearing 13 can be simplified in construction and can be readily processed to be finished with high accuracy. As a result, since the thickness of the partition frame component 14 can be unified, it is possible to raise and highly maintain the dimensional accuracy in assembling the thrust bearing 13 and rotary impeller component 11 by way of the bearing component 12 on the basis of the lower flat face of the partition frame component 14 and in securely mounting the stationary impeller component 8 on the basis of the upper flat face of the partition frame component 14. This fact makes a contribution to the reliable security of a gap defining between the stationary and rotary impellers 7 and 10 in the axial direction thereof and consequently, the compression efficiency can be raised and a frictional load can be reduced.

As described hereinbefore, since the distortion of the partition frame component 14 caused by the heat during the welding is minimized, the aforementioned axially defined gap can be set desirably as small as possible, thus contributing remarkably to the improvement of performance of the compressor.

The welding of the lower vessel 1, compression mechanism 2 and discharge side upper vessel 16 is conducted within a breadth that is substantially the same as the thickness of the projection 14a formed on the partition frame component 14, so that a single thin bead may be formed, and accordingly, such welding is superior in efficiency and low in cost, thus resulting in that the compressor can be advantageously produced in bulk and at low cost.

Moreover, since the material of the partition frame component 14 can be selected freely in accordance with workability, assembling property, the kind of that it can be subjected to welding, or the like, the compressor can be in compliance with its object.

In addition, since the space 21 on the discharge side of and within the compressor can be formed largely by the discharge side closed vessel 16, pulsation of a discharged flow can be lowered, thus resulting in that noise produced from the compressor of the present invention can be reduced considerably, as in the conventional compressor.

As clearly described so far, the compression mechanism portion provided in the compressor of the present invention not only is influenced little by the heat distortion caused by the welding, but also has a simple construction and accordingly, the compressor has highly accurate dimensions and can be produced desirably in bulk.

Although the present invention has been fully described by way of example with reference to the accompanying drawings, it is to be noted here that various changes and modifications will be apparent to those skilled in the art. Therefore, unless such changes and modifications otherwise depart from the spirit and scope of the present invention, they should be constructed as being included therein.

What is claimed is:

1. An electrically driven compressor comprising:

a lower vessel in which a suction space of the compressor is defined;

an electric motor disposed in the lower vessel;

a compression mechanism for compressing gas introduced into the suction space of the compressor, said compression mechanism comprising a stationary impeller component having a stationary impeller, a rotary impeller component having a rotary impeller for rotating relative to the stationary impeller, a plurality of spaces defined between said stationary impeller and said rotary impeller and communicating with said suction space, the gas entering into said plurality of spaces form said suction space so as to be compressed therein between the rotary impeller and the stationary impeller, a crank shaft operatively connected to said rotary impeller component and said electric motor for being driven by the electric motor to rotate said rotary impeller, a bearing component for rotatably supporting said crank shaft in the compressor, a self-rotation restricting means operatively connected to the rotary impeller component for preventing the rotary impeller from self-rotating when the gas enters said plurality of spaces and for only allowing a forced rotation thereof by said crank shaft, a thrust bearing operatively connected in a bearing relation with said rotary impeller component for supporting a thrust load exerted by said rotary impeller, a partition frame component interposed between said stationary impeller component and said bearing component;

an upper vessel encircling said stationary impeller component, and an upper space defined in said upper vessel, said upper space communicating with said plurality of spaces and in which the gas after being compressed in said plurality of spaces passes, said partition frame component extending between said suction space and said upper space and between respective free ends said upper vessel and said lower vessel for separating said suction space from said upper space except via said plurality of spaces; and a weld extending entirely along the outer periphery of said partition frame component for coupling the upper vessel to the lower vessel and the partition frame component to said vessels and for effecting a seal between said suction space and said upper space at the portion of the compressor at which said partition frame component extends between the upper vessel and the lower vessel.

2. An electrically driven compressor as claimed in claim 1, wherein the partition frame component has opposed surfaces that are flat and extend parallel to one another, said bearing component contacting and extending along both one of said opposed flat surfaces and said thrust bearing in a common plane, and said stationary impeller component contacting and extending along the other of said opposed flat surfaces.

3. An electrically driven compressor as claimed in claim 1, wherein said partition frame component includes a partition frame, and a projecting member projecting from and extending around the outer periphery of said partition frame, said projecting member sandwiched between said respective ends of the upper and lower vessels.

4. An electrically driven compressor as claimed in claim 2, wherein said partition frame component includes a partition frame, and a projecting member projecting from and extending around the outer periphery of said partition frame, said projecting member sandwiched between said respective ends of the upper and lower vessels.

* * * * *